July 19, 1927.                  E. TYDEN                    1,636,263
                              DRY PIPE VALVE
                           Filed July 14, 1923
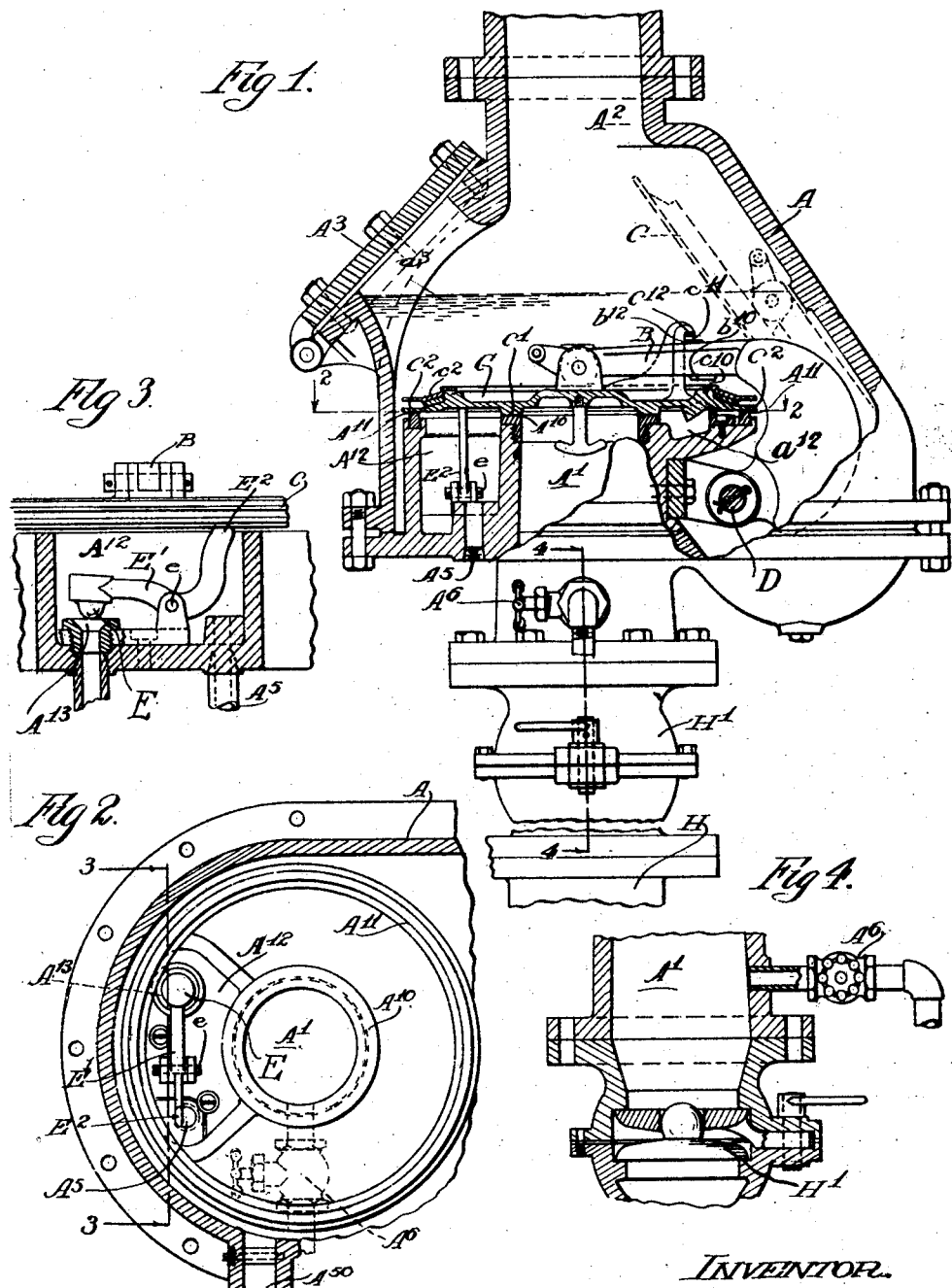

Patented July 19, 1927.

1,636,263

UNITED STATES PATENT OFFICE.

EMIL TYDEN, OF EVANSTON, ILLINOIS.

DRY-PIPE VALVE.

Application filed July 14, 1923. Serial No. 651,472.

The purpose of this invention is to provide a dry pipe valve construction which shall be held safe against the liability which arises in most dry pipe valves in present use to what is commonly called "columning," which is the accumulation of water above the main dry pipe valve by repeated momentary openings of the valve under throbbing of the pressure in the water main, such accumulation continuing until the head of water upon the valve is sufficient to prevent its opening when the air pressure is relieved by the opening of the sprinkler head thus defeating the intended operation of the system. The present improved invention insures against such mischance and consists in the elements and features of construction shown and described as indicated in the claims.

In the drawings:

Figure 1 is a vertical section of a dry pipe valve and water main to which it is attached embodying this invention, the section being in a plane axial in respect to the inlead and outflow passages and hand-hole.

Figure 2 is the section at the line 2—2 on Figure 1 showing the valve seats in plan view, the valve being removed.

Figure 3 is the detail section at the line 3—3 on Figure 2.

Figure 4 is a section at the line 4—4 on Figure 1.

The structure shown in the drawings comprises the valve casing, A, having water inlet passage, $A^1$, outlet passage, $A^2$, hand-hole, $a^3$, with cover, $A^3$, valve seats, $A^{10}$ and $A^{11}$, with inter-seat chamber, $a^{12}$, deepened at one side into a sump or drainage chamber, $A^{12}$, which is drained through a drainage port, $A^{13}$, controlled by an interior valve, E, and which has also a connection by way of a pipe, $A^6$, to alarm devices not shown.

The dry pipe valve body, A, is shown mounted upon an upright water main, H, in which below the dry pipe valve there is provided a manually operated shut-off valve, $H^1$; and the water inlet passage, $A^1$, of the dry pipe valve body, A, has a drain cock, $A^6$, accessible for manual operation below the body of the casing, A.

The inlet valve, C, is carried pivotally by a valve lever, B, which is fulcrumed at D, at one side of the inlet, $A^1$, below the plane of the valve seats. Said valve, C, has two seating areas corresponding to annular valve seats, $A^{10}$ and $A^{11}$; $C^1$, corresponding to the seat $A^{10}$, is, preferably, formed directly upon the metal face of the valve; but the seating element or member of the valve for seating upon the outer seat of the valve, $A^{11}$, is formed by a flexible annulus $C^2$, secured by its inner margin to the valve body by a clamping ring, $c^2$, the annular margin of the valve body, C, upon which the flexible annulus, $C^2$, is lodged and clamped by the ring, $c^2$, being, preferably, sloped at an angle to the plane of the valve seat so that the free or unclamped outer marginal portion of the annulus, $C^2$, is flexed from its normal frusto-conical form to the plane of the valve seat in order to seat thereon as seen in Figure 1. Both by reason of the flexible character of this seating annulus, and also by reason of the yielding character of the valve seat, $A^{11}$, which may be a rubber ring let into the metal, or by reason of the yielding character of either one of these two co-operating elements, $A^{11}$ and $C^2$, the valve seats at the outer seat, $A^{11}$, before it seats at the inner seat, $A^{10}$, for purposes which are well understood in respect to dry pipe valve structures having differential seating areas.

The valve and its carrying lever, B, considered as a unit, has the weight distributed so that it is normally over-balanced in the direction for opening and must be held upon its seat by some means until the air pressure is accumulated in the pipe line, and by reason of operating over the area of the outer of the two concentric valve seats, while the water pressure is exerted only over the smaller area of the inner of the said seats, becomes effective to hold the valve seated so long as such air pressure is maintained.

The hand-hole, $a^3$, is positioned so that the operator may conveniently reach in through it for any attention which may be required by the valve or its seat, and particularly for manually seating the valve preparatory to admitting the air pressure. The lowest point in the mouth of a hand-hole is at a level far enough above the valve to permit filling of the valve chamber, A, to a depth affording sufficient pressure of the water upon the valve to hold it seated against a tendency to open by gravity by reason of the proportions of the valve and its carrying lever overbalanced for opening as above mentioned.

It will be understood that the purpose of the inter-seat chamber, $A^{12}$, below the valve is to admit atmospheric pressure under the valve over the annular area between the two seats, while the pressure from the water main operates over the area defined by the inner seat, $A^{10}$, and super-atmospheric pressure operates above the valve over the area defined by the outer valve seat, $A^{11}$, which is the sum of the two areas first mentioned. In order that this inter-seat area may be thus exposed to atmospheric pressure, it is essential that means should be provided for draining of the water with which it will become filled whenever the valve is open upon the opening of a sprinkler head relieving the air pressure in the system, hence the drainage port, $A^{13}$, above mentioned. It is well understood that in a valve of this type, that is having the lesser seat defining an area exposed on the opposite side to the air pressure and constructed so that initial seating may occur at the outer larger seat before final seating occurs at the smaller seat, which is effected by the flexibility of either the seating element of the valve or of the seat as above described, there is a liability to momentary opening of the valve at the inner smaller seat by reason of throbbing of the water pressure causing it momentarily to greatly exceed the normal pressure; and it will be understood that when this occurs the water will momentarily pass over the inner seat into the inter-seat chamber. When this occurs in such small quantity as not to exceed the outflow capacity of the drainage port, $A^{13}$, no disturbance or need of attention results. But if in any instance, the escape of water over the inner seat, $A^{10}$, into the inter-seat chamber, exceeds the outflow capacity of the port, $A^{13}$, the inter-seat chamber becomes filled and the main valve becomes open at its seat, $A^{11}$, and water passes up through that seat and, in the absence of provisions to the contrary by repeated occurrences of this sort, there is built up a column of water above the main valve which, operating over the entire area of that valve, will hold the valve on its seat against the water pressure on the under-side over the area defined by the lesser seat notwithstanding the opening of the sprinkler heads releasing the water pressure in the system. In the present construction such water columning is prevented, and the means in addition to features already specified contributing to such prevention will now be described.

In the inter-seat chamber, there is provided the valve, E, above referred to, carried upon one arm of a lever, $E^1$, fulcrumed at $e$, in bracket arms upstanding from the bottom of the chamber, the other arm of said lever being extended from the opposite side of the fulcrum and upward as seen at $E^2$, so that when the valve, E, is seated, the upper part of said arm, $E^2$, projects above the plane of the valve, C, at the fully seated position of the latter; from which it results that the valve, C, in the concluding portion of its closing movement, opens the valve, E, to permit drainage from the inter-seat chamber of any water which may be admitted thereinto over the inner seat, $A^{10}$, up to the limit of flow capacity of the port, $A^{13}$. With this construction it will be understood that when, by reason of the throbbing of the pressure in the water main, water is momentarily passed over the inner-seat, $A^{10}$, into the inter-seat chamber at a rate more rapid than the outflow capacity of the port, $A^{13}$, so that the water accumulates in the inter-seat chamber up to the level of the seat, $A^{11}$, and passes out over that seat opening the valve thereat, the valve, E, becomes seated and the main valve is held open by the water accumulated in the inter-seat chamber and filling the same; and the air pressure above the limited water seal obtains access past the valve seat, $A^{11}$, to the under-side of the valve seat, thereby destroying the differential pressure by which the valve has been held seated; and thereupon the valve and its lever being forced with respect to the fulcrum for being over-balanced in direction for opening, opens instantly and fully and admits the water from the main which filling the inter-seat chamber and with pressure thereon causes discharge by way of the pipe, $A^5$, to the alarm devices and warns the attendants of a situation which requires shutting off both the water and air pressure and draining the system and re-seating the valve.

The construction above described, facilitates seating the device and utilizing the head of water upon the valve adequate for overcoming the counter-balance and holding the valve seated while accumulating super-atmospheric pressure in the pipe line; and as heretofore, more particularly pointed out, the construction described dispenses even with the necessity of having the head of water above the main valve sufficient to hold it seated against the counter-balance, the usual depth of water for sealing the valve lip $C^2$ being all that is necessary to have before admitting and accumulating the air pressure. For setting the device and initially seating the valve, the operator, first closing the drain-cock, $A^6$, opens the water inlet valve, $H^1$, in the water main sufficiently to allow the water to slowly fill up the casing, A, to a sufficient depth above the valve seat to serve as a water seal, and if desired up to the level of the lower side of the hand-hole, $a^3$, which level, as above mentioned, is enough above the level of the valve seat to afford water head sufficient for over-coming the counter-balance and holding the main valve initially seated; then the operator closing the valve $H^1$, with one hand, with the other hand reaches through the hand-hole and swings the main valve down through the water onto its seat pressing it firmly thereon. In moving thus to its seat, the main valve opens the valve, E, as above described, and the freedom for outflow of water from the inter-seat chamber through the drainage port, $A^{13}$, produces a condition of partial vacuum under the valve between the two seats, sufficient to cause the valve to be held firmly to its seat notwithstanding the counter-balance for opening by gravity and independently of the depth of water above the valve except to the extent sufficient for water sealing it at the seat, will so operate quite independently of the pressure or presence of any water above the main valve, provided said valve is actually fully seated so that there is no air leak past it. This main essential function of the water in the valve chamber above the main valve in this phase of the operation, is to merely moisten the co-operating surfaces of valve and valve seat and thereby insure perfect seating or sealing of the valve on the seat. The operator will now open the drain-cock, $A^6$, which by affording opportunity for out-flow of the water in the water main and valve body, above the shut-off valve, $H^1$, causes a partial vacuum to be created in the passage, $A^1$, within the area of the seat, $A^{10}$, which further operates for causing the valve C to be held securely upon its seat. The hand-hole being now closed and the air pressure admitted above the valve and to the system, the drain cock, $A^6$, will be closed and the shut-off valve, $H^1$, in the water main, H, will be opened and the entire system is thereby set for functioning according to its purpose.

Certain further details of construction tend to facilitate the operation as above described and these details will now be indicated.

The fulcrum of the valve carrier lever, B, is necessarily below the plane of the valve seats and, as shown, is in a vertical plane which cuts the outer valve seat, $A^{11}$, inwardly of its outer circumference and outwardly from the outer circumference of the inner valve seat. By reason of the vertical plane of the fulcrum being inward of the outer circumference of the outer valve seat the range of pivotal movement of the valve about its fulcrum on the carrying lever is necessarily made sufficient to compensate for the downward swing of the right hand side of the valve lip, $C^2$, in its opening movement about the fulcrum, D, through an arc whose sine is the width of the seating area of the lip, $C^2$, on the seat, $A^{11}$. This range of pivotal movement of the valve with respect to the carrier is indicated by the space, $c^{10}$, between the top of the valve and the boss, $b^{10}$, projecting downwardly from the lever arm. In any event, in order to accommodate the possible slight departure from perfect parallelism between the valve seats and the valve faces this range of pivotal movement of the valve carrier in both directions is necessary. This range in opposite directions from that indicated at $c^{10}$, is shown at the interval, $c^{11}$, between the nose of the overhanging hook, $C^{12}$, which projects up from the valve, C, and overhangs the abutment, $b^{12}$, on the lever arm, B. The effect of locating the fulcrum of the valve carrying lever, B, as described, viz: in a vertical plane inward from the outer circumference of the outer valve seat is to cause the main valve in its seating movement from open position to encounter the seat at the side at which the fulcrum, D, is located, with a slightly upward movement before the valve lip encounters the seat at the opposite side, that is, so that in the completion of the seating movement the valve rocks slightly about its pivot to the carrying lever, fulcruming for such rocking at the right hand side at which the seat was first encountered, thus insuring that the valve is seated throughout the entire circumference of the seat when it operates by encounter with the part, $E^2$, for opening the drainage valve, E. The certainty that the valve is seated throughout in the sealing water before the opening of the drainage port, tends to produce suction, is very important, since otherwise that suction would be liable to exhaust the seal and measurably defeat or render uncertain the intended operation.

I claim:

1. In a dry pipe valve having the main valve constructed for seating at two seats through one of which the water main pressure operates for opening said main valve, while through the other seat said main valve is normally exposed to atmospheric pressure, said main valve and its carrier being as unit proportioned with respect to the fulcrum of the carrier for being normally overbalanced in the direction for opening; a shut-off valve for controlling the admission of water from the water main to the main valve; the main valve body having a chamber back of the second mentioned seat which is accessible to water from the main and which has a drainage port deeply situated with respect to the level of the main valve seat for causing said port to be sealed by substantial depth of water above said port when said chamber is filled; a valve controlling said drainage port which is normally seated, and automatic means for setting said last mentioned valve at open position at the closed position of the main valve.

2. In the construction defined in claim 1, foregoing, the means for setting the drainage port-controlling valve at open position being adapted for operation for that purpose by the main valve.

3. In the construction defined in claim 1, foregoing, said drainage-controlling valve being mounted and connected for being opened by the main valve in the concluding part of the closing movement of said main valve.

4. In a dry pipe sprinkler system in combination with a main valve body having a chamber for a main valve, a fulcrumed main valve structure therein, said valve body and the main valve structure therein constructed for seating of the main valve at two seats through one of which the water main pressure operates for opening the main valve while through the other the valve is normally exposed to atmospheric pressure, said main valve structure being proportioned with relation to its fulcrum for being normally overbalanced in the direction for opening, the valve body having a chamber back of the second mentioned seat which is accessible to water from the water supply main and which has a drainage port deeply situated with respect to the level of the main valve seat for causing said port to be sealed by substantial depth of water above said port when said chamber is filled, the main valve chamber having a hand-hole whose lower side is at a level above the valve seat, whereby water may be accumulated in said chamber to cover said seat when the hand-hole is open; a shut-off valve controlling admission of water from the supply main, and a manually operable drain cock between the shut-off valve and a dry pipe main valve.

5. In a dry pipe valve structure having the main valve constructed for seating at two seats through one of which the water main pressure operates for opening the valve while through the other seat the valve is normally exposed to atmospheric pressure, a fulcrumed carrier for the main valve, the main valve and its carrier being as a unit proportioned with respect to the fulcrum of the carrier for being normally overbalanced in the direction for opening; the valve body having a chamber back of the second mentioned seat which is accessible to water from the main and which has a drainage port deeply situated with respect to the level of the main valve seat for causing said port to be sealed by substantial depth of water above said port when said chamber is filled, a valve controlling said drainage port mounted and carried for normally closing the same, the mounting and carrying means comprising a part which at closed position of said drainage valve projects into the path of the concluding portion of the closing movement of the main valve so as to be encountered and moved for opening the drainage port as the main valve is approaching closed position, the dry pipe valve body having a hand-hole for access to the main valve chamber whose lower side is at a level above the main valve seat, whereby water may be accumulated in said chamber to cover the seat when the valve is open; a shut-off valve controlling the admission of water from the water main, and a drain-cock between the shut-off valve and the dry pipe main valve.

6. In a dry pipe sprinkler system in combination with a main valve body having a chamber for a main valve; a fulcrumed main valve structure therein, said body and main valve structure being constructed for seating of the main valve at two seats through one of which the water main pressure operates for opening the main valve while through the other seat said valve is normally exposed to atmospheric pressure, the main valve structure being proportioned with relation to its fulcrum for being normally overbalanced in the direction for opening the main valve, the main valve body having a chamber back of the second mentioned seat which is accessible to water from the supply main and which has a drainage port, the main valve body having a hand-hole opening into the chamber above the main valve, the lower side of said hand-hole being at a level above the main valve seat a sufficient distance for accumulation above said valve while the hand-hole is opened of a head of water sufficient to hold the valve seated against its overbalance for opening; a shut-off valve for controlling the admission of water from the water supply main, and a drain cock between said shut-off valve and the dry pipe main valve.

7. In a dry pipe valve a main valve and a fulcrumed valve carrier, said main valve constructed for seating at two seats through one of which the water main pressure operates for opening the valve while through the other seat the valve is normally exposed to atmospheric pressure, the main valve and its carrier being as a unit proportioned with respect to the fulcrum of the carrier for being normally over-balanced in the direction for opening; a shut-off valve for controlling the admission of water from the water main; the valve body having a chamber back of the second mentioned seat which is accessible to water from the main and which has a drainage port deeply situated with respect to the level of the main valve seat for causing said port to be sealed by substantial depth of water above said port when said chamber is filled, the dry pipe valve body having a hand-hole opening to the chamber above the main valve, the lower side of said hand-hole being at a level above the valve seat a sufficient distance for the accumulation above the valve while the hand-hole is open of a head of water sufficient to hold the valve seated against its over-balance for opening; a valve which controls said drainage port being mounted and carried for normally closing said port, the mounting and carrying means comprising a part which at closed position of said drainage valve projects into the path of the concluding portion of the closing movement of the main valve so as to be encountered and moved for opening the drainage valve as the main valve is approaching closed position.

8. In a dry pipe valve system the method of initially seating the main valve and setting the device ready for operation which comprises the following steps: (1) while the hand-hole is open admitting water from the main to fill the casing to a level above the valve seat to a depth to form a water seal at the seat; (2) shutting off the water and manually depressing the main valve through the water in the casing to its seat; (3) opening for drainage of the water from beneath the valve to produce a partial vacuum for holding the valve seated; (4) closing the hand-hole and admitting the air pressure; (5) closing the drainage port and opening the shut-off valve to admit the water from the main.

In testimony whereof, I have hereunto set my hand at Chicago, Illinois, this 6th day of July, 1923.

EMIL TYDEN.